United States Patent
Kelly et al.

(10) Patent No.: US 12,148,340 B1
(45) Date of Patent: Nov. 19, 2024

(54) COMPUTING DEVICE

(71) Applicant: Lenovo (Singapore) Pte. Ltd., Singapore (SG)

(72) Inventors: Sean C Kelly, Morrisville, NC (US); Michael Ripp, Morrisville, NC (US); Kazuo Fujii, Yokohama (JP); Koichiro Ishigami, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 18/240,155

(22) Filed: Aug. 30, 2023

(51) Int. Cl.
*G09G 3/20* (2006.01)
*G06F 1/16* (2006.01)

(52) U.S. Cl.
CPC ............. *G09G 3/20* (2013.01); *G06F 1/1681* (2013.01); *G06F 1/1686* (2013.01); *G09G 2320/08* (2013.01); *G09G 2340/0442* (2013.01)

(58) Field of Classification Search
CPC .......... G09G 3/20; G09G 2320/08; G09G 2340/0442; G06F 1/1681; G06F 1/1686
See application file for complete search history.

(56) References Cited

U.S. PATENT DOCUMENTS

| | | | | |
|---|---|---|---|---|
| 2006/0188173 A1* | 8/2006 | Zhang | ................. | H04N 7/0122 348/E5.111 |
| 2009/0244832 A1* | 10/2009 | Behar | ................. | G06F 1/1637 361/679.55 |
| 2012/0133616 A1* | 5/2012 | Nishihara | ........... | G06F 3/03542 345/175 |
| 2018/0090462 A1* | 3/2018 | Kellar | ..................... | H01L 21/56 |
| 2018/0213166 A1* | 7/2018 | Kim | .................. | H04N 23/6811 |
| 2020/0213520 A1* | 7/2020 | Shoda | ................. | G11B 27/326 |

OTHER PUBLICATIONS

"The Adaptive Wide Angle filter", which is part of a book by M. Evening, entitled "Adobe Photoshop CS6 for Photographers" (Focal Press, ISBN 9780240526041) (6 pages).

* cited by examiner

*Primary Examiner* — Abbas I Abdulselam
(74) *Attorney, Agent, or Firm* — Brian J. Pangrle

(57) ABSTRACT

A computing device can include a base housing; a display housing that includes a display, a display side, a back side and a back side camera; a hinge assembly that couples the base housing and the display housing; an orientation sensor that senses orientation of the display housing; and image circuitry that, based on output of the orientation sensor, controls rendering of imagery acquired by the back side camera to the display.

20 Claims, 12 Drawing Sheets

COMPUTING DEVICE

TECHNICAL FIELD

Subject matter disclosed herein generally relates to technology for computing devices.

BACKGROUND

A computing device can include a portion that includes a camera and another portion that can serve as a base where the portion that includes the camera can be adjustable with respect to the portion that can serve as the base. For example, a laptop computing device (e.g., a laptop computer) can be a clamshell device with portions that can open and close where one of the portions can include a camera and be adjustable with respect to another one of the portions that can serve as a base. In such an example, the camera may be outwardly facing where an adjustment alters a view direction of the camera.

SUMMARY

A computing device can include a base housing; a display housing that includes a display, a display side, a back side and a back side camera; a hinge assembly that couples the base housing and the display housing; an orientation sensor that senses orientation of the display housing; and image circuitry that, based on output of the orientation sensor, controls rendering of imagery acquired by the back side camera to the display. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
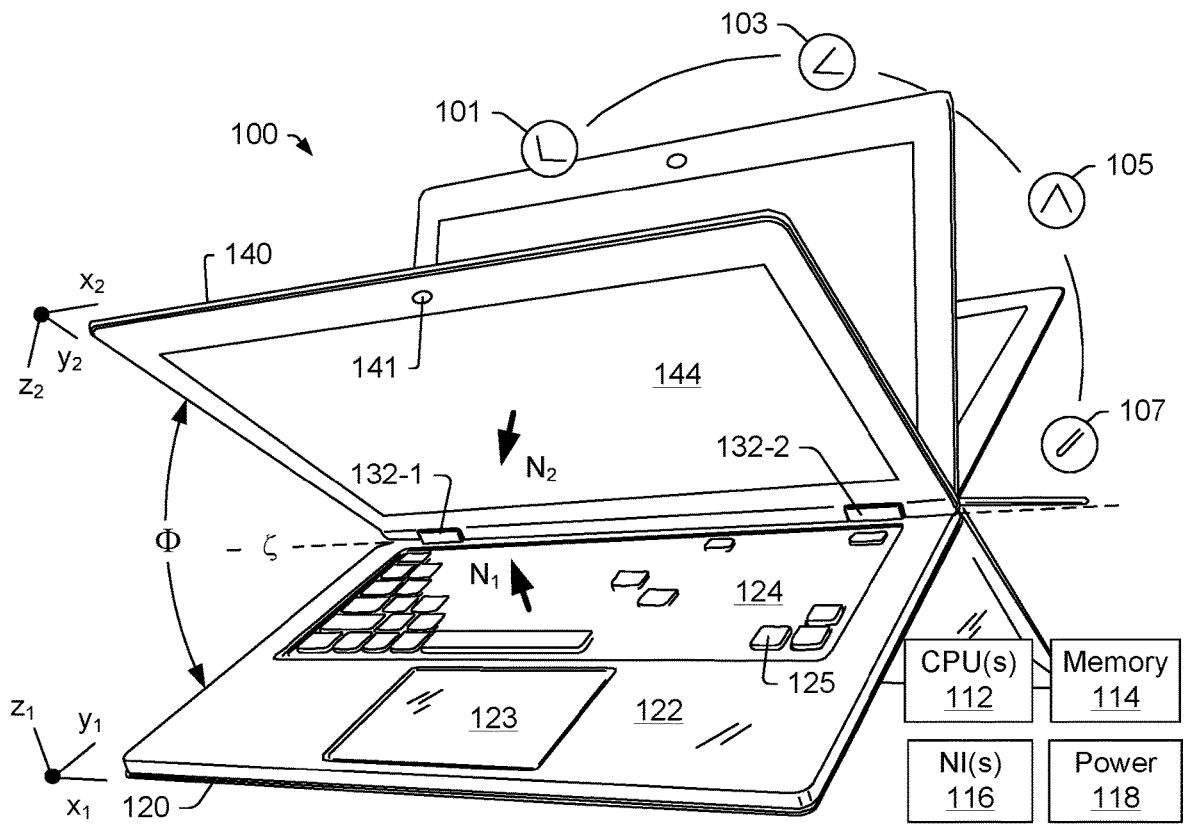
FIG. 1 is a diagram of an example of a computing device.
Figure 1:
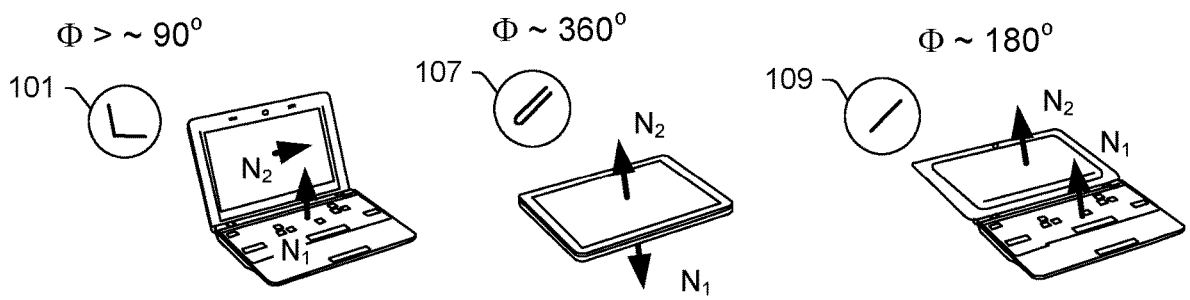

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other, whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the user's hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
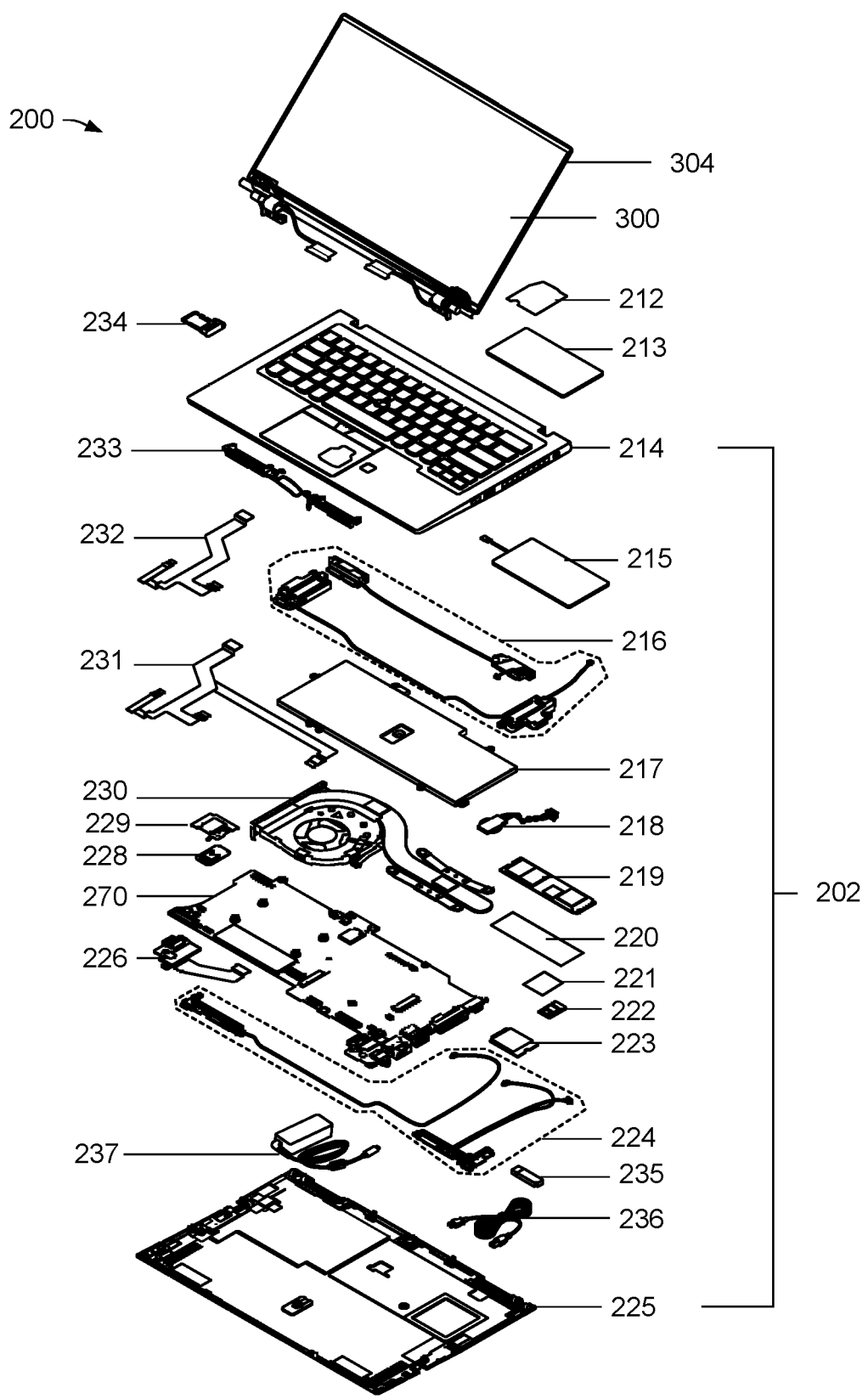
FIG. 2 is a diagram of an example of a computing device or computing system.

FIG. 2 shows an exploded perspective view of a computing device 200 as including various components, which can include, for example, a display assembly 300, a housing 304 (e.g., a display housing), insulation trackpad tape 212, a trackpad 213 or 215, a keyboard bezel assembly with a keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237. The computing device 200 may be referred to as a computing system that can include various components, circuitry, etc.

In the example of FIG. 2, various components can form a housing 202, which may be referred to as a base housing and/or a keyboard housing, where the housing 202 may be coupled to the housing 304 via one or more hinge assemblies, etc. For example, the computing device 200 can include a first housing 202 coupled to a second housing 304 via one or more hinge assemblies (see, e.g., one or more hinge assemblies 326 of FIG. 3, etc.).

Figure 3:
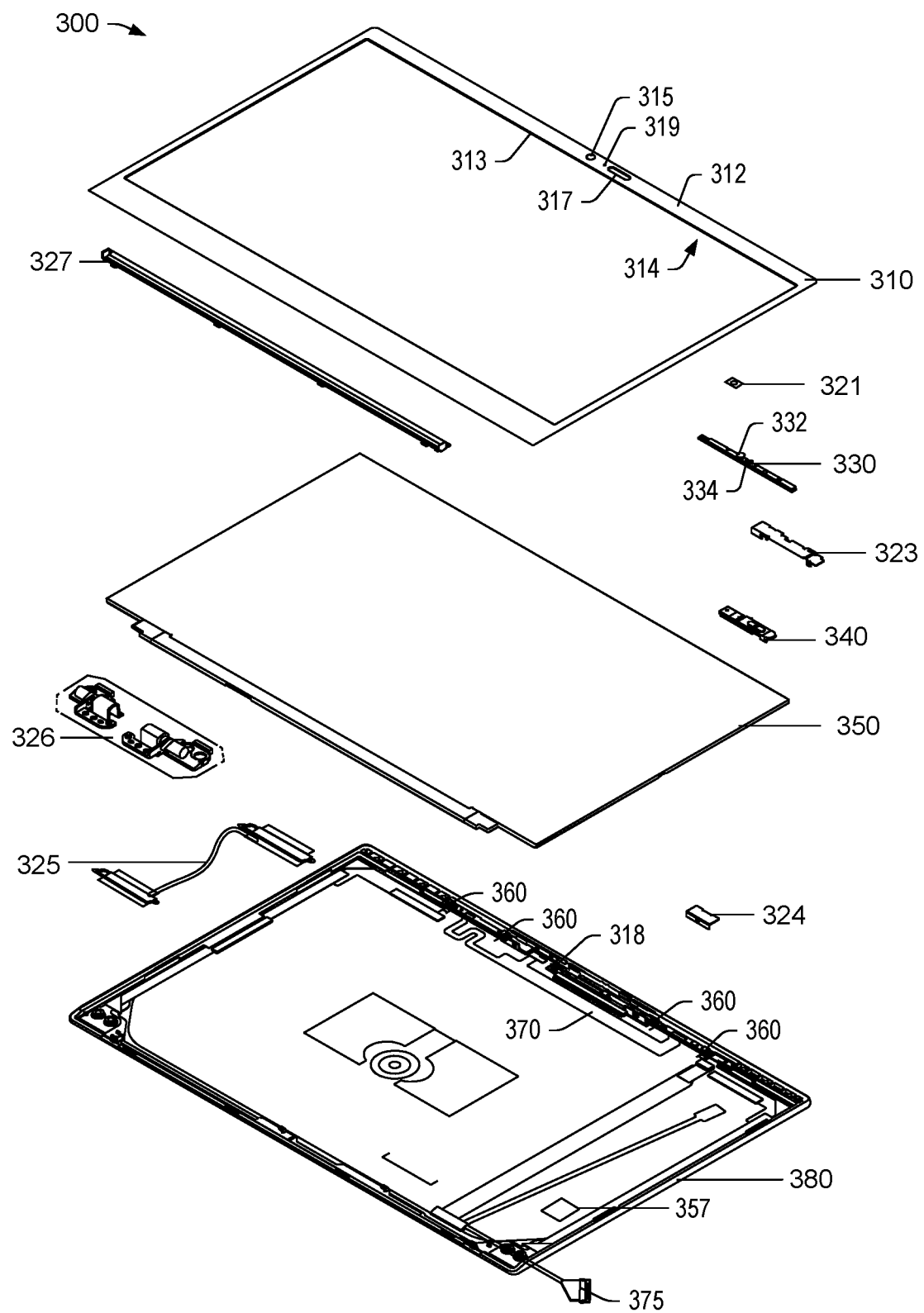
FIG. 3 is a diagram of an example of a display assembly of the computing device or computing system of FIG. 2.

FIG. 3 shows an exploded perspective view of the display assembly 300 of FIG. 2 as including various components, which can include, for example, a bezel 310, a foam component for an IR LED camera 321, a camera assembly 330, a stopper 323, a shutter 340, a display panel 350, an orientation sensor 357 (e.g., an accelerometer, gyroscope, etc.), a support plate 324, one or more microphones 360, wiring 370, one or more wiring connectors 375, a back side (rear) cover assembly 380, a display cable 325, one or more hinge assemblies 326, and a display bezel frame component 327. As shown, the display assembly 300 can be assembled to form the display housing 304, for example, by joining the bezel 310 (e.g., as a front side cover) and the back side cover assembly 380.

In the example of FIG. 2 and FIG. 3, the computing device 200 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a front facing camera opening 315, a shutter control opening 317, and an IR camera opening 319 (e.g., where an IR camera is included, noting that a camera may be a combined visible and IR camera). In the example of FIG. 3, the back side cover assembly 380 can include a back facing camera opening 318. In such an example, the camera assembly 330 can include a front facing camera 332 that utilizes the front facing camera opening 315 and can include a back facing camera 334 that utilizes the back facing camera opening 318. In such an example, the front facing camera 332 and the back facing camera 334 may capture views in substantially opposite directions (e.g., a front facing view and a back facing view).

As shown in the example of FIG. 3, the camera assembly 330 can couple to the back side cover assembly 380 where the wiring 370 operatively couples to the camera assembly 330 and to the one or more microphones 360. The display assembly 300 can be operatively coupled to other circuitry of the computing device 200, for example, via the one or more wiring connectors 375.

As an example, a display housing can be referred to as being bezel-less where the size of a bezel or a frame is relatively small such that a display panel can extend to an edge or near an edge. For example, consider a smartphone that may have an edge of a housing or a frame that forms a thin bezel (e.g., less than 5 mm) about a display surface (e.g., a display glass, etc.).

As an example, inclusion of a bezel along one or more portions of a perimeter of a display housing, where such one or more portions have a thickness greater than a few millimeters, may help to provide protection for a display panel, which may include a display glass (e.g., cover glass).

While the example computing devices 100 and 200 are shown as including housings that can be relatively rigid, separate and coupled via one or more hinge assemblies, a computing device may be bendable and may include a bendable display or a rigid display. A computing device that is bendable may include portions that can be defined with respect to one or more hinge assemblies where such portions may be or include separate housings that are coupled via the one or more hinge assemblies. For example, a bendable computing device may include a housing with display circuitry and a camera and another housing with keyboard circuitry where the housings are coupled such that the bendable computing device can be a clamshell device that can be closed and opened.

As explained, a computing device can include a back facing camera, which may be referred to as a "world" facing camera. Where such a camera is in a physically fixed position in a housing, the view of the camera changes as the housing is adjusted (e.g., moved). Where a computing device is set on a surface (e.g., a tabletop, a desktop, a countertop, etc.), a user may adjust a display housing to be open beyond an angle of 90 degrees such that the back facing camera has a downwardly directed view. For example, if the user opens the display housing to 110 degrees, the back facing camera may have a downwardly directed view at an angle of 70 degrees (e.g., 180 degrees minus 110 degrees). In such an example, the view may not adequately frame content (e.g., a person, people, content, etc.). For example, if the computing device renders to a display a captured view with a downward angle of 70 degrees, a person in the view may be positioned off-center and in the top of the view where the remainder of the view (e.g., middle to bottom) may be wasted space (e.g., without content of interest).

As an example, a computing device can include circuitry that can automatically adjust to provide for rendering an improved view or optimal view for a back facing camera. For example, consider circuitry for an optimally aimed world facing camera capture with a wide field of view and a sensor driven crop (e.g., consider a sensor that may be an inertial measurement unit (IMU), etc.).

As explained, a world facing camera on a back side of a laptop display housing can point downward relative to horizontal when the laptop is supported on a horizontal surface and opened to an angle greater than 90 degrees. In such a scenario, the camera can largely capture images of a desktop surface that the laptop is seated upon.

As explained, a world facing camera can be mounted behind a display panel of a laptop or in a bezel region such that it tends to be aimed downward when the laptop is open and in use (e.g., display panel facing a user). In various instances, the resulting captured image can include mostly low relevance content such as a surface of a desktop, tabletop, countertop, etc., as situated behind the laptop as the world facing camera is pointed downward.

As an example, a computing device can include a relatively wide field of view (FOV) back facing camera which, even though pointed downward, can still capture, in addition to a supporting surface, more of desired, relevant content in a portion of the FOV that is above the supporting surface. For example, consider a scenario where a user is seated at a table with a laptop supported on a top surface of the table and where another individual is seated at the table opposite the user. In such an example, the laptop can automatically adjust a captured image such that the individual seated opposite the user can be substantially centered in a rendered image (e.g., as may be rendered to a display of the laptop and/or transmitted remotely during a videoconferencing session). While the foregoing scenario mentions a single individual seated opposite the user, a scenario may involve multiple other individuals that are to be captured by a back facing camera (e.g., a world facing camera).

As explained, a back facing camera can provide a relatively large FOV such that an appropriate region above a supporting surface can be captured even when the back facing camera is pointing downward at an angle of 70 degrees to approximately 50 degrees. As mentioned, a computing device can include one or more sensors that can determine an angle of a housing that includes a back facing camera. For example, consider an IMU that can output a signal as to hinge angle of a display housing and thus the angle at which a back facing camera is pointed. This positional information can be utilized to drive a capture crop window extracting a relevant portion of the FOV that is of interest to a user.

As an example, a wide FOV world facing notebook PC camera combined with an IMU reporting laptop display hinge angle, designed to use display (and camera) angle information, can drive relevant cropping of captured imagery corresponding to one or more capture geometries, which may be akin to a capture geometry as if the back facing camera was pointed straight in a horizontal direction.

As explained, a computing device can include a relatively wide FOV back facing camera for world facing image capture, which images a larger volume of object space that can include both downwardly looking and forwardly looking object spaces. Such a computing device can utilize one or more sensors that can determine an angle of a display housing (e.g., via a hinge assembly, via integration of the sensor into the display housing, via sensing the display housing via another housing, etc.) such that the pointing angle of the back facing camera can be determined. As mentioned, a computing device can include circuitry that can provide for cropping of captured imagery such that relevant content can be substantially centered and, for example, presented in accordance with one or more aspect ratios that may be specified for camera images, displays, etc. A cropping approach can capture a subsection of a full FOV image where, for example, the subsection may correspond to a horizontal camera pointing angle that includes relevant/interesting object space content.

As an example, a lens may have some associated distortion. For example, a wide-angle lens can introduce some amount of distortion such as, for example, barrel distortion. Certain lenses, such as, for example, a fish-eye lens, can introduce distortion where a fish-eye lens is an ultra wide-angle lens that produces strong visual distortion intended to create a wide panoramic or hemispherical image. In combination with a sensor, a wide-angle lens may be defined as being circular, cropped circle or full-frame. For example, consider the following specifications for an example of an ultra wide-angle lens in Table 1, below.

TABLE 1

| Aspect Ratio | Circular | Cropped Circle | Full-frame |
| --- | --- | --- | --- |
| 3:2 | 52% sensor | 78% FOV, 92% sensor | 59% FOV |
| 4:3 | 59% sensor | 86% FOV, 90% sensor | 61% FOV |

As an example, a circular fish-eye lens can utilize a 180 degree hemisphere that is projected as a circle within a frame. Thus, a circular fish-eye lens can cover a smaller image circle than a rectilinear lens designed for the same sensor size. In such an approach, the corners of a circular fish-eye image will be unfilled (e.g., black), which differs from gradual vignetting of rectilinear lenses and sets on abruptly. As an example, a full-frame or diagonal fish-eye lens can have an angle of view (AOV) that measures 180 degrees from corner to corner (e.g., a 180 degree diagonal AOV), noting that horizontal and vertical angles of view will be smaller. For an equisolid angle 15 mm full-frame fish-eye, consider, for example, a horizontal AOV of 147 degrees and a vertical AOV of 94 degrees. As to a cropped circle fish-eye lens, it may be considered an intermediate between a diagonal (full-frame) fish-eye lens and a circular fish-eye lens that has a circular image optimized for the width of a format rather than the height. As a result, on a non-square format, the circular image will be cropped at the top and bottom, but still show black edges on the left and right. As an example, a portrait fish-eye effect may be achieved by using a fish-eye lens intended for full coverage of a smaller sensor format, like an APS diagonal fish-eye on a 35 mm full frame camera, or an M43 diagonal fish-eye on APS.

Figure 4:
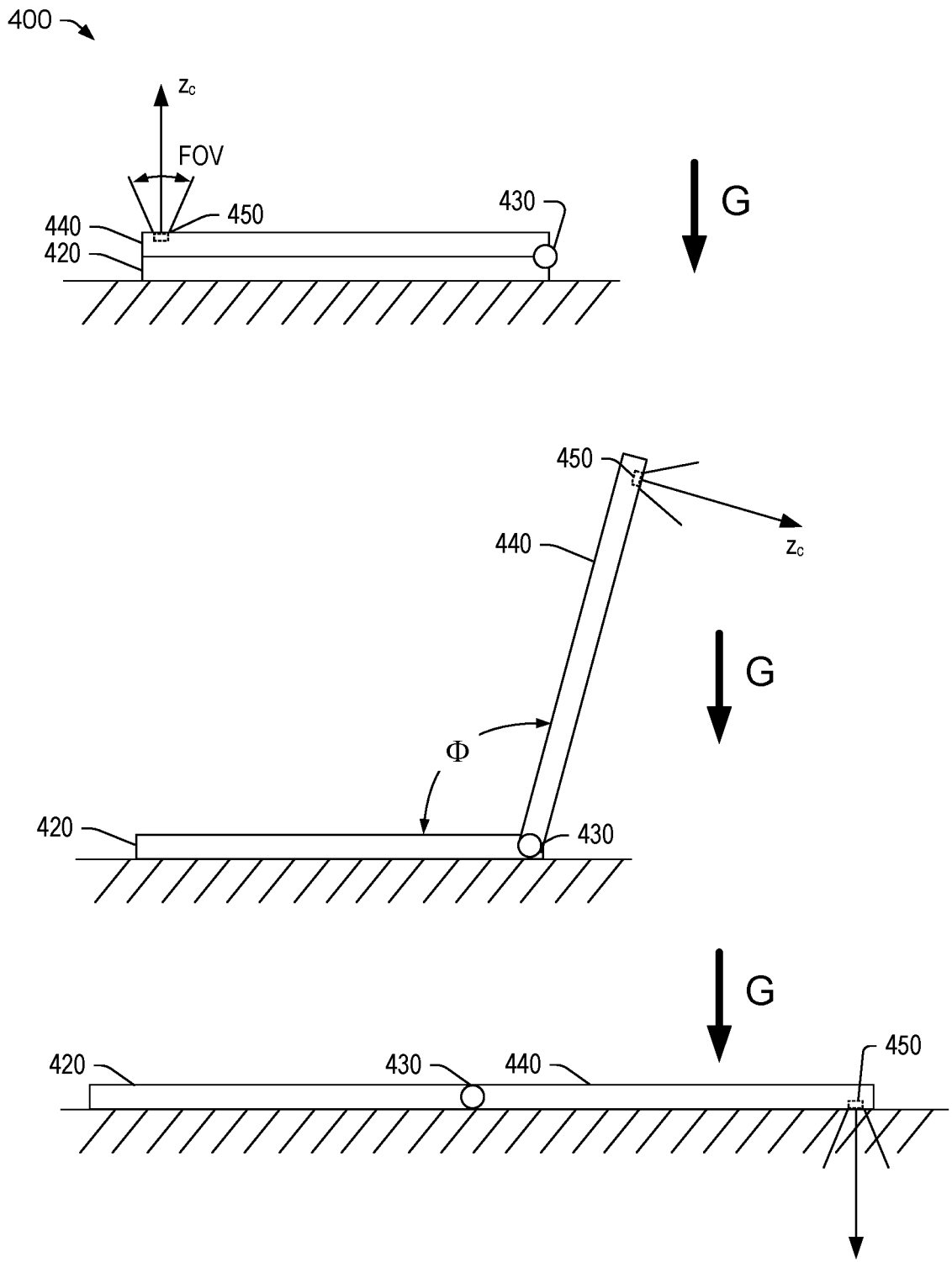
FIG. 4 is a diagram of an example of a computing device.

FIG. 4 shows an example of a computing device 400 that includes a base housing 420 and a display housing 440 coupled via a hinge assembly 430 where the display housing 440 includes a back facing camera (BFC) 450 (e.g., a back side camera), which has a defined FOV and direction along a camera axis, $z_c$. In the example of FIG. 4, the computing device 400 is seated on a support surface that is horizontal where a direction of the acceleration of gravity is downward and normal to the support surface.

In FIG. 4, the computing device 400 is shown as being closed, open to an angle Φ greater than 90 degrees and less than approximately 135 degrees, and open to an angle Φ of 180 degrees. In the non-180 degrees open example, the angle of the camera axis $z_c$ of the BFC 450 can be less than 90 degrees and greater than approximately 45 degrees (e.g., 180 degrees minus Φ).

Figure 5:
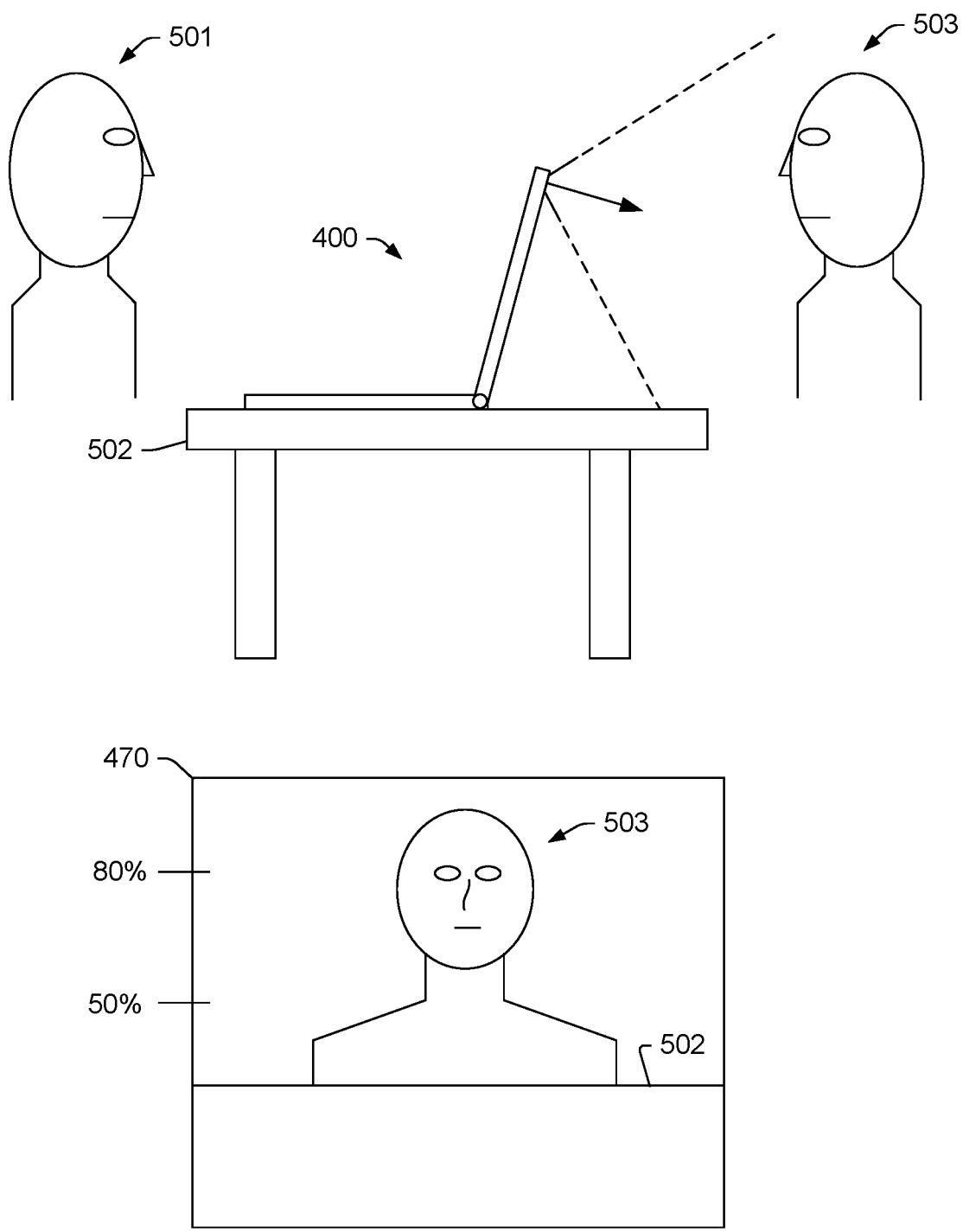
FIG. 5 is a diagram of an example of the computing device of FIG. 4.

FIG. 5 shows a scenario where the computing device 400 is open and supported on a tabletop 502 where a user 501 is positioned in front of the computing device 400 and an individual 503 is positioned in back of the computing device 400, opposite the user 501. As shown, an image 470 can be rendered to a display where a portion of the individual 503 and a portion of the tabletop 502 appear in the image 470. As to the position of the eyes of the individual 503, they appear at about 80 percent of the height of the image 470 and the tabletop 502 occupies over 35 percent of the image 470. In this example, the individual 503 can be relevant whereas the tabletop 502 can be irrelevant, hence, the image 470 includes over 35 percent irrelevant content.

Figure 6:
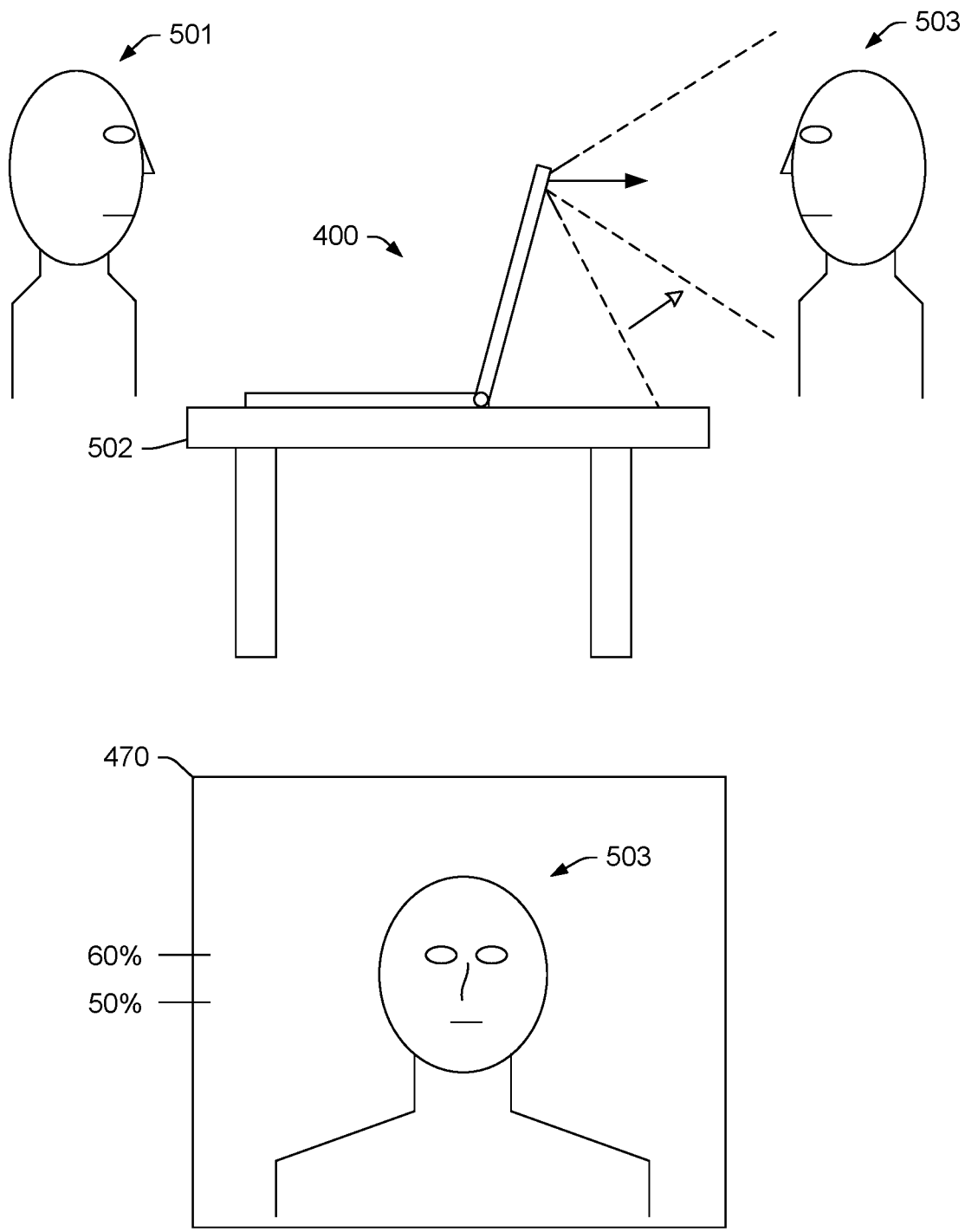
FIG. 6 is a diagram of an example of the computing device of FIG. 4.

FIG. 6 shows the same scenario as in FIG. 5, however, the computing device 400 now implements circuitry to adjust imagery captured by the BFC 450. As shown by dashed lines, the imagery captured by the BFC 450 is cropped such that the tabletop 502, which is deemed irrelevant content, is eliminated or substantially reduced from being present in the image 470. Further, the eyes of the individual 503 now appear at approximately 60 percent of the height of the image 470. Hence, the image 470 in FIG. 6 is improved compared to the image 470 in FIG. 5 through use of various circuitry, which, as mentioned, can include a wide FOV camera (e.g., photodetector, lens, etc.), cropping circuitry and may include one or more sensors.

Figure 7:
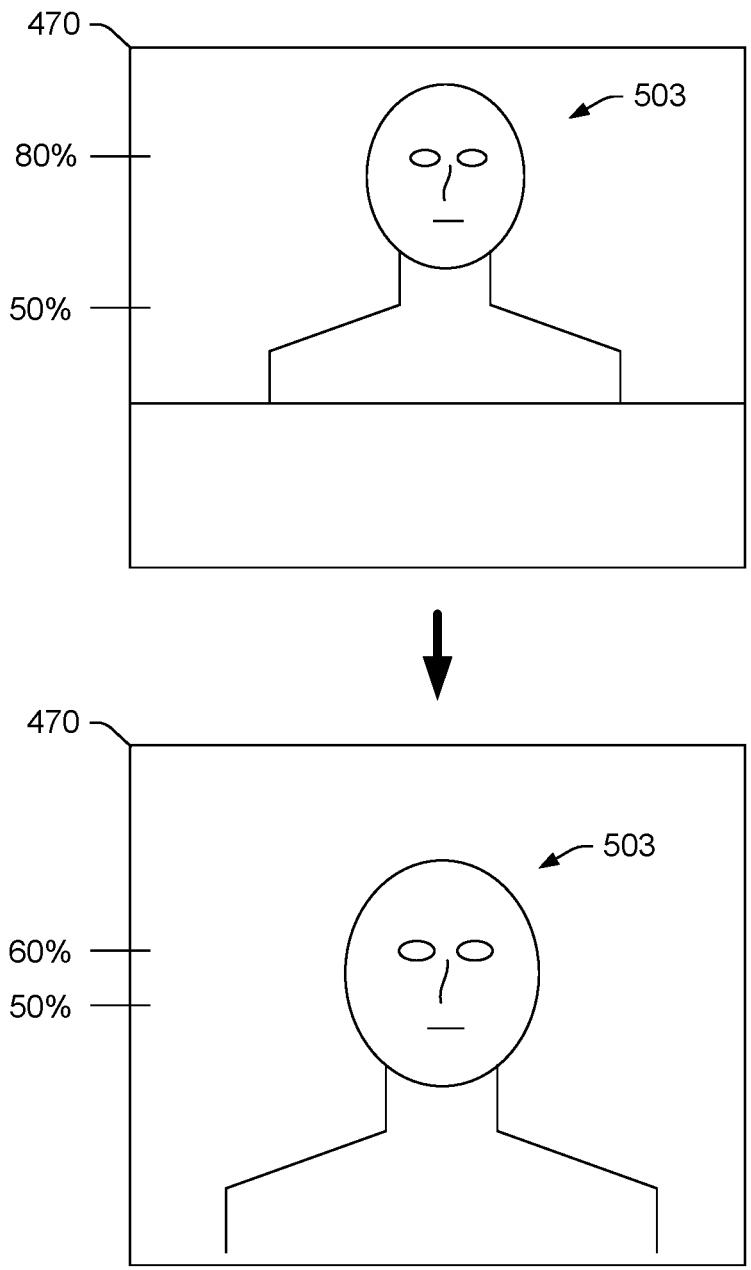
FIG. 7 is a diagram of an example of image improvement.

FIG. 7 shows a comparison between the image 470 of FIG. 5 and the image 470 of FIG. 6. As explained, the computing device 400 can include features that provide for improved image rendering from a back facing camera (e.g., the BFC 450).

Figure 8:
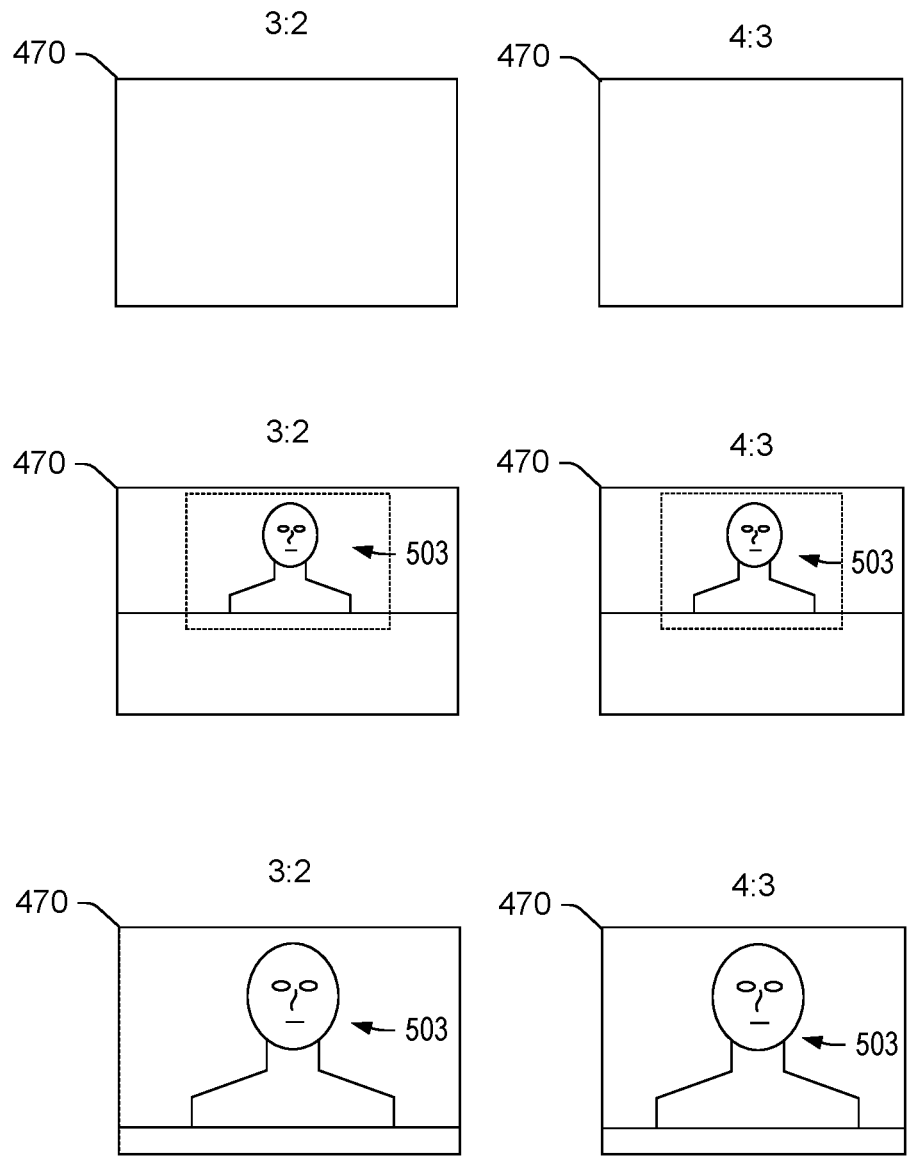
FIG. 8 is a diagram of examples of image improvement.

FIG. 8 shows a series of images with a 3:2 aspect ratio and a series of images with a 4:3 aspect ratio. As an example, an aspect ratio may correspond to a camera sensor. The default aspect ratio on most digital SLR cameras is 3:2, which is the aspect ratio of the imaging sensor regardless of whether the sensor is full-frame, Advanced Photo System type-C (APS-C), or Advanced Photo System type-H (APS-H). This is a carryover from analog (film) photography where the film frame is also in a 3:2 ratio, which measures 24 mm×36 mm. The 4:3 aspect ratio, used by the Micro Four-Thirds alliance, is in the same aspect common to medium format film cameras, but one where the film frame size is larger. The 4:3 film frame on medium-frame cameras measures 60 mm×45 mm. Other models of medium format cameras shoot images in the 1:1 (or 6:6) aspect, while some shoot in the 7:6 aspect ratio. Image aspects may be available as a selection option in an image aspect function of a digital camera.

Compact cameras may include varying aspect ratio sensors, depending on their make, while smartphone cameras tend to use the 16:9 ratio, which when shot vertically, appears as the longish 9:16 image aspect. Common aspect ratios include 3:2, 4:3, 16:9, and 1:1, which may be shot hypothetically on a digital camera with a 3:2 image aspect sensor.

The aspect ratio of 3:2 tends to be a native format of various camera sensors, which can be full-frame (36.00 mm×23.9-24.3 mm), APS-C(CANON EF—22.20 mm×14.80 mm; NIKON DX, SONY NEX/Alpha DT, PENTAX K—23.6-23.7 mm×15.60 mm) or APS-H (27.90 mm×18.60 mm) sized.

When a lens is considered, only part of an image produced by the lens may be captured by a sensor, for example, the APS-C size sensor captures only a portion of an image produced by a camera lens. In general, a lens image tends to be circular whereas a sensor tends to be rectangular (e.g., including square). For example, a sensor can be inscribed within a circle or otherwise within a circle of a lens image. In some instances, a sensor may include a polygonal shape with stepped corners, for example, consider a footprint of a sensor that can be defined by overlaying two rectangles such that stepped corners are formed.

As to FOV, it can be utilized to measure width of an area that can be captured. For example, a webcam with a wide-angle lens has broader FOV. As to some examples, consider 60 degrees as being suitable to capture one person sitting in front of a computer; 78 degrees as being wide enough to capture two people facing a camera; and 90 degrees as being suitable or showing a whiteboard or a group of people seated at a conference room table. In the foregoing examples, the angles may be cone angles as defined using a circular shaped lens or lens assembly. As an example, a lens may be adjustable as to angle of FOV or may be fixed as to angle of FOV. As to a range of angles, a computing device may include a camera (e.g., with a lens or lens assembly) that is at a fixed angle or adjustable as to angle, within a range from approximately 50 degrees to 180 degrees. As explained, a wider angle (e.g., greater than 40 degrees) can provide for a FOV of a back facing camera that can capture imagery of a relevant object or relevant content when a display housing is opened at an open angle greater than 90 degrees (e.g., and less than approximately 145 degrees) such that captured imagery can be cropped to help exclude some amount of irrelevant (e.g., non-relevant) content.

As shown in FIG. 8, a cropping window can be utilized that can have an aspect ratio that corresponds to a standard aspect ratio. In the examples of FIG. 8, the cropping window (dashed lines) can be utilized to frame relevant content such as an individual that appears in a FOV of a back facing camera, for example, while reducing presence of irrelevant content. In such an approach, the aspect ratio can be preserved.

Figure 9:
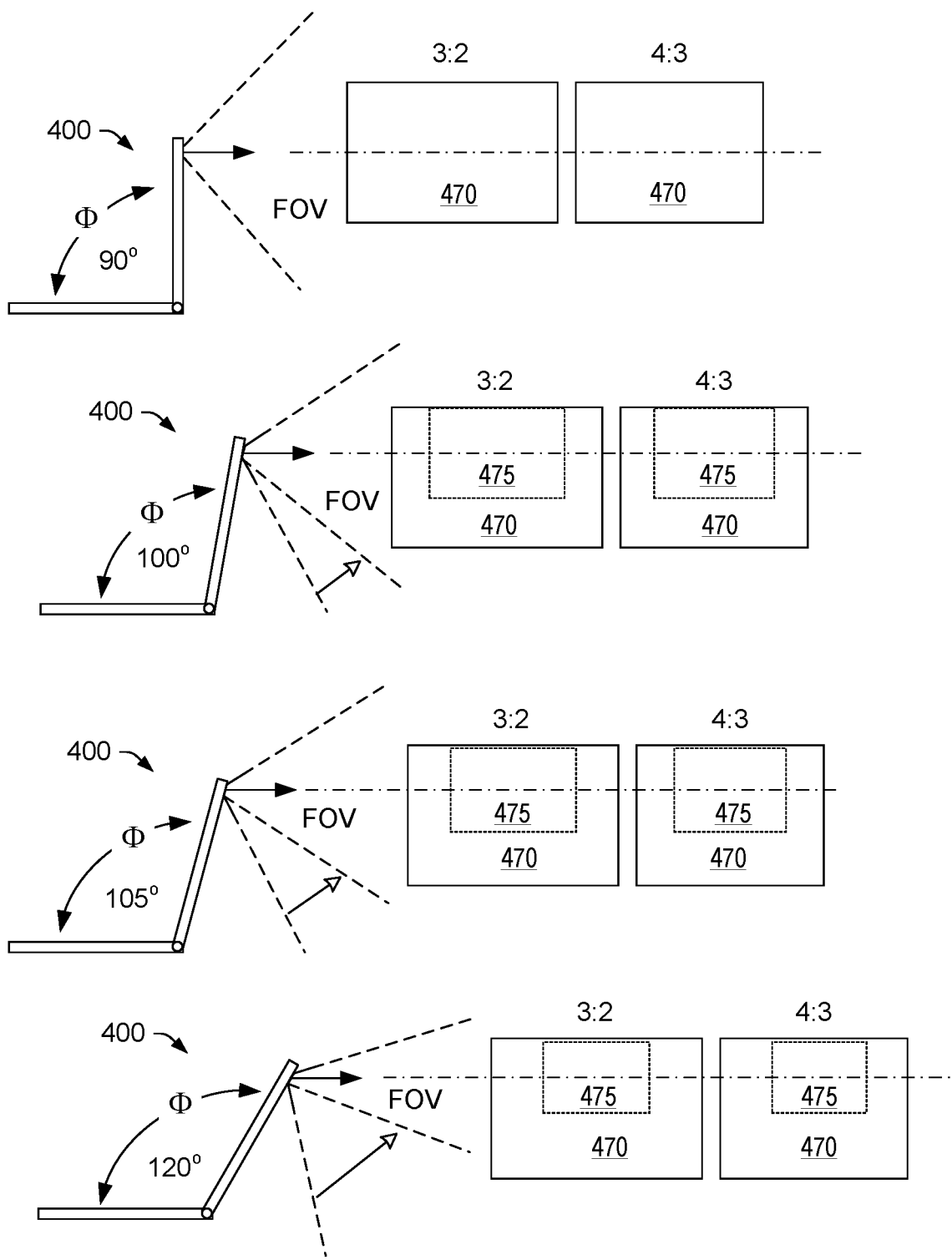
FIG. 9 is a diagram of an example of the computing device of FIG. 4.

FIG. 9 shows various examples of cropping with respect to different open angles of the computing device 400. As shown, for an angle of 90 degrees, no cropping may be implemented; whereas, for angles of 100 degrees, 105 degrees and 120 degrees, cropping may be implemented where the cropping window size decreases with respect to increasing open angle. For example, at 120 degrees open, the cropping window size is smaller than the cropping window size for the 100 degrees open example. While such an approach may impact resolution, given the relatively high resolution of various cameras, the resolution will tend to be acceptable, particularly where the fill-factor for relevant content is improved and the fill-factor for irrelevant content (e.g., supporting surface) is decreased.

As an example, a computing device can include a base housing; a display housing that includes a display, a display side, a back side and a back side camera; a hinge assembly that couples the base housing and the display housing; an orientation sensor that senses orientation of the display housing; and image circuitry that, based on output of the orientation sensor, controls rendering of imagery acquired by the back side camera to the display.

As explained, an orientation sensor can generate output that indicates, directly or indirectly, an angle of a back facing camera such as, for example, an angle of a camera axis (see, e.g., the camera axis $z_c$ in FIG. 4). Such a sensor may be operatively coupled to a hinge assembly where the sensor can determine an open angle of two portions of a computing device. As an example, sensor data generated by more than one sensor may be utilized. For example, consider a sensor in a base housing and a sensor in a display housing or a hinge assembly where a determination may be made with respect to a direction of acceleration of gravity, a horizon (e.g., horizontal position), etc. Referring again to the example of FIG. 3, the orientation sensor 357 is shown as part of the display assembly 300, which includes the back facing camera 334, which may be part of the camera assembly 330 or part of another camera assembly (e.g., another instance of the camera assembly 330, another different camera assembly, etc.).

As an example, one or more accelerometers may be included in a computing device. As an example, even if a portion of a computing device with an accelerometer is not moving, the accelerometer can detect the orientation (e.g., tilt) of at least a portion of the computing device by measuring the acceleration due to gravity, which provides a relatively constant downward force. For example, an accelerometer can determine if an object is parallel to the Earth's surface or if it's tilted. As an example, one or more accelerometers can be utilized to sense orientation of one or more portions of a computing device, for example, to assist in cropping of imagery captured by a back facing camera of the computing device. As an example, an accelerometer can be used to measure tilt (in degrees), which may be utilized for pitch and roll, where pitch is rotation on one axis, which means an object is tilted up or down, and roll is rotation on an orthogonal axis, which means an object is tilted right or left.

As an example, a computing device can perform cropping responsive to sensing of an angle of a camera, directly or indirectly, where the cropping may be performed based at least in part on sensor data. In such an example, the cropping may occur without performing object recognition. For example, an assumption may be made that a relevant object is within an upper portion of a captured image and/or that an irrelevant object is within a lower portion of a captured image where a dividing line depends on an angle, as may be determined based on sensor data. As an example, where object recognition is employed, it may provide for edge detection that can detect an edge of a support surface such as, for example, a tabletop, a desktop, a countertop, etc., where an assumption can be made that image content from the edge and below is irrelevant while image content above the edge is relevant.

As to edge detection, one or more approaches may be utilized, which may include one or more of Canny, Kovalevsky, other first-order methods, thresholding and linking, edge thinning, second-order approaches, differential, phase congruency-based, phase stretch transform (PST), subpixel, etc.

As an example, cropping may be performed using an assumption that relevant content is centered between left and right sides of captured imagery. For example, an individual may be relevant and substantially centered along a centerline between left and right sides of captured imagery.

Figure 10:
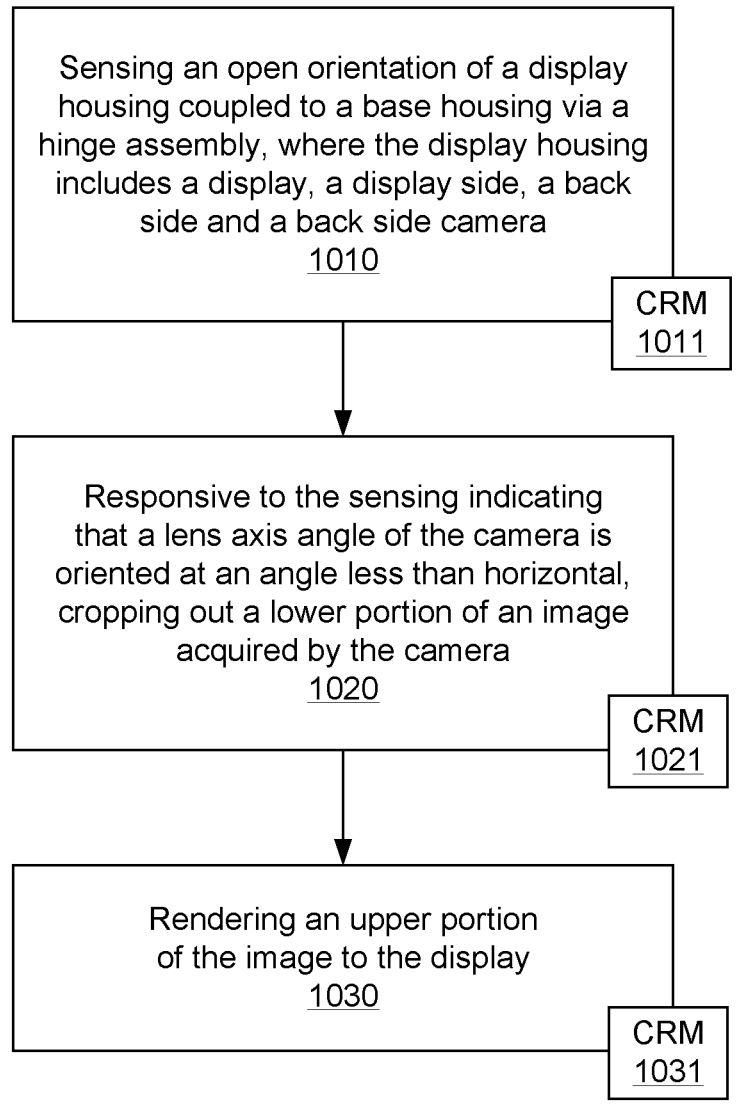
FIG. 10 is a diagram of an example of a method.

FIG. 10 shows an example of a method 1000 that includes a sensing block 1010 for sensing an open orientation of a display housing coupled to a base housing via a hinge assembly, where the display housing includes a display, a display side, a back side and a back side camera; a cropping block 1020 for, responsive to the sensing indicating that a lens axis angle of the camera is oriented at an angle less than horizontal, cropping out a lower portion of an image acquired by the camera; and a rendering block 1030 for rendering an upper portion of the image to the display.

The method 1000 is shown in FIG. 10 in association with various computer-readable media (CRM) blocks 1011, 1021 and 1031. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1000. As an example, a computer-readable medium (CRM) may be a computer-readable storage medium that is non-transitory and that is not a carrier wave. As an example, one or more of the blocks 1011, 1021 and 1031 may be in the form processor-executable instructions.

Figure 11:
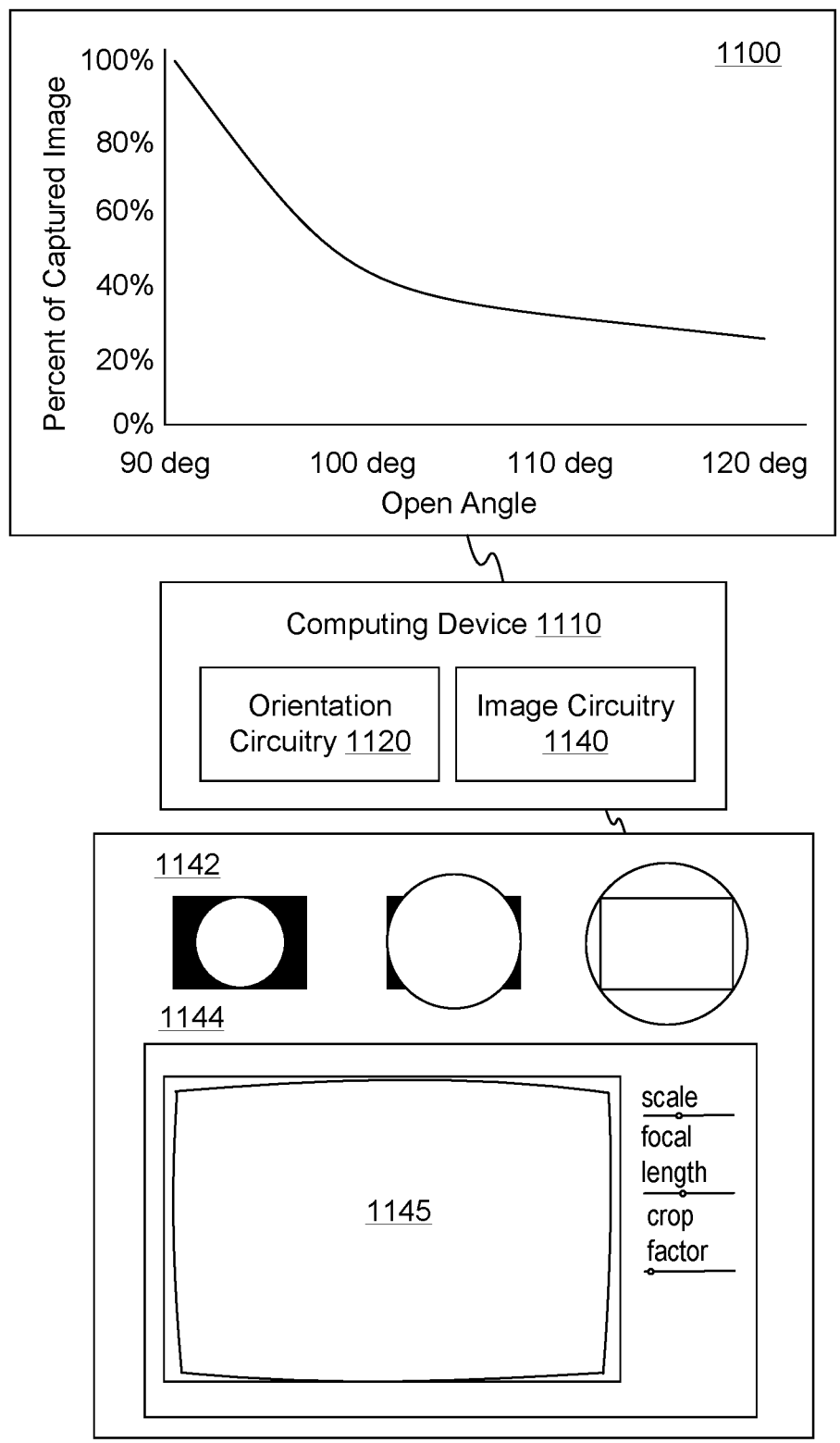
FIG. 11 is a diagram of an example of a graphical user interface and an example of a computing device.

FIG. 11 shows an example of a graphical user interface (GUI) 1100 and an example of a computing device 1110 that includes orientation circuitry 1120 and image circuitry 1140, which may include features for processing lens and sensor relationships 1142 and which may include features for adjusting for distortion 1144 (e.g., distortion correction) of imagery 1145.

As shown in the example of FIG. 11, a relationship can exist between percent of captured image and open angle. For example, consider the relationships shown in FIG. 9 for the open angles 90 degrees, 100 degrees, 105 degrees and 120 degrees, which show that the area of the captured image at 90 degrees open angle becomes progressively smaller as the open angle is increased from 100 degrees to 105 degrees to 120 degrees, noting that an open angle of greater than 120 degrees may be operable. In various instances, a smaller portion may include less corner-related types of distortion; noting that some amount of distortion may still exist for a smallest portion (e.g., depending on one or more factors such as, for example, type of lens).

As explained, orientation information can be utilized for cropping where, for example, orientation information may optionally be adjusted to account for deviation from horizontal. For example, if a base of a computing device is tilted on a support surface such that a back end of the base is raised above a front end of the base. In such an example, a display that is oriented directly upward may actually correspond to an open angle that is greater than 90 degrees, however, a back facing camera may be directed outwardly horizontal such that it corresponds to the 90 degrees example of FIG. 9. Conversely, if a front end is elevated above a back end of a base and a display is oriented directly upward, the open angle may be less than 90 degrees. In such examples, one or more orientation sensors may provide for determining the angle of a display with respect to gravity and/or with respect to a base. In various examples, adjustments may be made to comport with examples shown in FIG. 9 and, for example, the relationship shown in the GUI 1100 of FIG. 11. As an example, the GUI 1100 may provide for one or more of default values, self-learning, edge detection, object detection, user adjustment, etc. As an example, the GUI 1100 may provide a cut-off value where cropping is terminated, for example, at an open angle greater than a threshold angle (e.g., 135 degrees, etc.).

As mentioned, a wide-angle lens may be utilized as part of a back side camera. As explained with respect to Table 1, depending on angle, imagery may be within a frame with black corners, partially within a frame with black corners or cover a frame where a portion of the imagery is outside of the frame. In various instances, the black corners at the top may extend inwardly toward a center of an image such that the black corners (e.g., or other corner distortion) occupies a substantial width to left of center and to right of center; noting that at the top, at or about the center, in various instances, distortion may be minimal. Hence, an amount of distortion that remains after cropping may depend on extent of cropping. For example, more cropping may result in less remaining distortion as corners are cropped out; however, as more of a remaining portion of an image is closer to a top side of the image, more of the remaining image may possibly be distorted (e.g., particularly near relevant content such as a human).

As explained, a wide-angle lens may introduce some amount of distortion. As an example, an adaptive wide angle filter may be utilized to correct distortion (e.g., consider one or more features of the PHOTOSHOP application adaptive wide angle filter). For example, filtering techniques may reduce lens distortions by using a camera and/or a lens model and pre-programmed details to straighten an image, by setting one or more constraints that may identify one or more areas of an image to be straightened, etc. A book chapter entitled "The Adaptive Wide Angle filter", which is part of a book by M. Evening, entitled "Adobe Photoshop CS6 for Photographers" (Focal Press, ISBN 9780240526041) is incorporated by reference herein. In the example of FIG. 11, the features 1144 may be implemented automatically, which may depend on open angle (e.g., cropping, closeness to border, etc.). In such an approach, one or more of scale, focal length, and crop factor and/or one or more other techniques, additionally or alternatively, may be implemented. In such an approach, at least some amount of distortion may be corrected and/or otherwise reduced. As an example, a combination of cropping and distortion correction may be applied to improve imagery captured by a back facing camera of a computing device where such cropping and/or distortion correction may depend on an angle of a housing that carries the back facing camera.

As an example, the orientation circuitry 1120 can include and/or be operatively coupled to one or more sensors such that the orientation circuitry 1120 can output information to the image circuitry 1140, for example, to crop a captured image such that relevant content can be preserved while at least some irrelevant content can be excluded (e.g., cropped out). As an example, the orientation circuitry 1120 and/or the image circuitry 1140 can be operatively coupled to one or more processors where, for example, processor-executable instructions may be stored in memory and accessed to implement one or more methods for improving rendering of captured imagery.

As an example, a computing device can include a base housing; a display housing that includes a display, a display side, a back side and a back side camera; a hinge assembly that couples the base housing and the display housing; an orientation sensor that senses orientation of the display housing; and image circuitry that, based on output of the orientation sensor, controls rendering of imagery acquired by the back side camera to the display. In such an example, the image circuitry can control rendering of the imagery based at least in part on the output of the orientation sensor being indicative of an angular value between the display housing and a direction of gravity. For example, consider operation wherein, for the angular value being indicative of a lens axis angle of the camera being less than horizontal, the image circuitry crops out a lower portion of the imagery and renders an upper portion of the imagery.

As an example, image circuitry can crop out a lower portion of imagery and render an upper portion of the imagery responsive to a sensed orientation of a display housing of a computing device being at an internal angle greater than a predetermined internal angle with respect to a base housing of the computing device. In such an example, the predetermined internal angle may be 90 degrees. As an example, such an angle may be a default angle and/or may be set as the predetermined internal angle responsive to a determination that the base housing is substantially horizontal (e.g., 0 degrees, plus or minus 3 degrees). As an example, a computing device may include a sensor that can detect orientation of a base housing of the computing device where, for example, one or more parameters for cropping of imagery by image circuitry may be set based on a detected orientation of the base housing. For example, consider setting a predetermined internal angle between a base housing and a display housing of a computing device based on orientation of the base housing of the computing device (e.g., with respect to gravity, etc.).

As an example, image circuitry can adjust an aspect ratio of an upper portion of imagery captured by a back side camera of a display housing of a computing device. In such an example, to adjust the aspect ratio, the image circuitry can crop out one or more side portions of the upper portion of the imagery.

As an example, a back side camera of a display housing of a computing device can include a lens and an image sensor. In such an example, the lens may project a circular image where a perimeter of the image sensor is within the circular image. As an example, an image sensor may have an aspect ratio of 1 to 1. As an example, an image sensor may have a rectangular aspect ratio defined by a long dimension and a short dimension and, for example, a display can have a rectangular aspect ratio defined by a long dimension and a short dimension. In such an example, the long dimension of the image sensor may be parallel to the short dimension of the display.

As an example, a lens may have a field of view greater than 60 degrees. As an example, a lens may have a field of view of at least 78 degrees. In such examples, the lens may be a lens of a back side camera of a display housing of a computing device that includes a base housing that is coupled to the display housing.

As an example, an orientation sensor may sense orientation of a display housing by sensing a position of a hinge assembly that couples the display housing to another housing, which may be a base housing. As an example, a computing device may be a clamshell computing device with a base housing and a display housing coupled by a hinge assembly. As an example, a base housing may be a keyboard housing or, for example, it may be another display housing (e.g., consider a computing device with a foldable display that is supported by two housings or housing portions that can fold via a hinge assembly. In such an example, one of the housings or housing portions may function as a base housing.

As an example, an orientation sensor may sense orientation of a display housing with respect to a direction of gravity. As an example, image circuitry may provide for object recognition, edge detection, etc., which may be for recognition and/or detection of a surface upon which a base housing of a computing device is supported. For example, consider a tabletop, a desktop, a countertop, etc., as a surface that can support a base housing. In various instances, such a surface may be substantially horizontal, which may be measured by one or more sensors and/or assumed. As to orientation of a display housing, at approximately 90 degrees, it may be considered to be aligned with a direction of gravity (e.g., a plane of the display housing is aligned with the direction of gravity). As an example, where the display housing is rotated via a hinge assembly that couples the display housing to a base housing, the display housing may be at an angle with respect to the direction of gravity (e.g., not aligned). If the angle is increased beyond 90 degrees, then a back side camera of the display housing may capture part of a support surface such that as the angle is further increased, the amount of a captured image that is occupied by the support surface may increase. As the support surface may be irrelevant (e.g., wasted image space), image circuitry may operate to automatically crop out at least a portion of the support surface, which may result in enlarging a remaining portion of a captured image, which includes relevant information (e.g., a person, people, a particular object or objects).

As an example, output of an orientation sensor may indicate one or more of orientation of a display housing with respect to a direction of gravity and orientation of the display housing with respect to a base housing.

As an example, a method can include sensing an open orientation of a display housing coupled to a base housing via a hinge assembly, where the display housing includes a display, a display side, a back side and a back side camera; responsive to the sensing indicating that a lens axis angle of the camera is oriented at an angle less than horizontal, cropping out a lower portion of an image acquired by the camera; and rendering an upper portion of the image to the display. In such an example, the base housing may be supported on a support surface that is substantially horizontal (e.g., approximately 0 degrees, plus or minus 5 degrees). As an example, a method can include adjusting an aspect ratio of an upper portion of an image prior to rendering of the image. As an example, a method can include transmitting an image, which may be an adjusted image, which may be a cropped image. For example, consider transmitting the image as part of a videoconferencing sessions where multiple people may be present where one or more cameras of a computing device capture images of one or more of the multiple people.

As an example, one camera may capture imagery of a person (e.g., first video imagery) to one side of a display housing while another camera (e.g., a back side camera) may capture imagery of another person (e.g., second video imagery) to an opposing side of the display housing. In such an example, image circuitry may process the imagery, optionally to form a combined image (e.g., side-by-side, etc.), which may be video imagery, for transmission via one or more networks. In such an example, a receiving device may render the images, whether separate or combined, to a display. In such an example, the images may be harmonized such that persons present appear similarly framed within image boundaries (e.g., occupying a similar percentage of an image space).

As an example, a method can include correcting distortion of an upper portion of an image prior to rendering. For example, consider a camera that may be a back side camera with a relatively wide-angle lens that may introduce some amount of distortion near an image boundary. For example, barrel distortion may occur when using a wide-angle lens as the field of view (FOV) of a wide-angle lens may be wider than an image sensor of a digital camera and therefore the image looks like it has been squeezed and constricted to fit in edges of a frame. As mentioned, an adaptive wide angle filter may be utilized to correct distortion (e.g., consider one or more features of the PHOTOSHOP application adaptive wide angle filter). For example, filtering techniques may reduce lens distortions by using a camera and/or a lens model and pre-programmed details to straighten an image, by setting one or more constraints that may identify one or more areas of an image to be straightened, etc.

As an example, image circuitry may automatically apply a distortion correction or adjustment technique that may be based in part on an angle, an amount of a support surface in an image, etc. As an example, a method can include cropping and adjusting for distortion of imagery captured by a back side camera of a display housing in a manner that depends on an angle of the display housing of a computing device. As an example, one or more distortion related parameters may include scale that may help to minimize one or more blank spots that may be present after a wide angle filter is applied; focal length that may specify the focal length of the lens that captured the imagery; crop factor that may be used in combination with scale to minimize and compensate for one or more blank areas produced by a wide angle filter; and "as shot", which may be utilized if a lens profile can be detected, whereas, if not, image circuitry may resort to determining values of scale, focal length, and crop factor. As an example, a computing device may include memory that stores one or more data structures that may provide such values for adjusting for distortion, which may depend on an angle of a display housing. As explained, as an angle increases, cropped imagery may be more toward an edge of captured imagery and hence more distorted where a wide-angle lens is utilized. Hence, as an angle increases, distortion in cropped imagery may increase and hence one or more distortion adjustments applied.

As an example, one or more non-transitory computer-readable media can include processor-executable instructions to instruct a processor-based controller to: sense an open orientation of a display housing coupled to a base housing via a hinge assembly, where the display housing includes a display, a display side, a back side and a back side camera; responsive to the sensing indicating that a lens axis angle of the camera is oriented at an angle less than horizontal, crop out a lower portion of an image acquired by the camera; and render an upper portion of the image to the display.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 12:
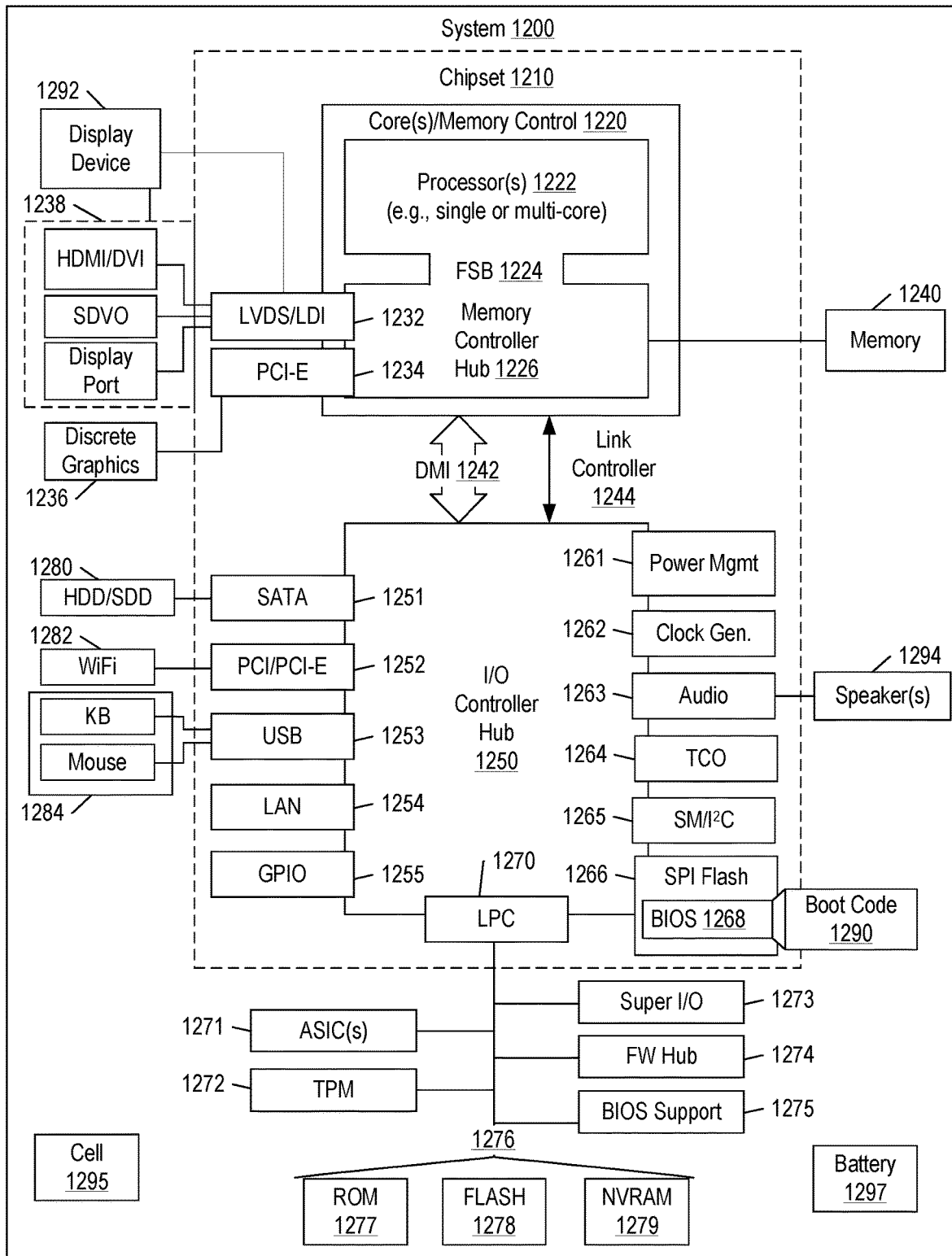
FIG. 12 is a diagram of an example of a system that includes one or more processors.

While various examples of circuits or circuitry have been discussed, FIG. 12 depicts a block diagram of an illustrative computer system 1200. The system 1200 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
    a base housing;
    a display housing that comprises a display, a display side, a back side and a back side camera;
    a hinge assembly that couples the base housing and the display housing;
    an orientation sensor that senses orientation of the display housing; and
    image circuitry that, based on output of the orientation sensor, controls rendering of imagery acquired by the back side camera to the display, wherein the image circuitry crops out a lower portion of the imagery and renders an upper portion of the imagery responsive to the sensed orientation of the display housing being at an internal angle greater than a predetermined internal angle with respect to the base housing.

2. The computing device of claim 1, wherein the predetermined internal angle is 90 degrees.

3. The computing device of claim 1, wherein the image circuitry adjusts an aspect ratio of an upper portion of the imagery.

4. The computing device of claim 3, wherein, to adjust the aspect ratio, the image circuitry crops out one or more side portions of the upper portion of the imagery.

5. The computing device of claim 1, wherein the back side camera comprises a lens and an image sensor.

6. The computing device of claim 5, wherein the lens projects a circular image wherein a perimeter of the image sensor is within the circular image.

7. The computing device of claim 5, wherein the image sensor comprises an aspect ratio of 1 to 1.

8. The computing device of claim 5, wherein the image sensor comprises a rectangular aspect ratio defined by a long dimension and a short dimension and wherein the display comprises a rectangular aspect ratio defined by a long dimension and a short dimension.

9. The computing device of claim 5, wherein the lens comprises a field of view greater than 60 degrees.

10. The computing device of claim 5, wherein the lens comprises a field of view of at least 78 degrees.

11. The computing device of claim 1, wherein the orientation sensor senses orientation of the display housing by sensing a position of the hinge assembly.

12. The computing device of claim 1, wherein the orientation sensor senses orientation of the display housing with respect to a direction of gravity.

13. The computing device of claim 1, wherein the output of the orientation sensor indicates one or more of orientation of the display housing with respect to a direction of gravity and orientation of the display housing with respect to the base housing.

14. A method comprising:
    sensing an open orientation of a display housing coupled to a base housing via a hinge assembly, wherein the display housing comprises a display, a display side, a back side and a back side camera;
    responsive to the sensing indicating that a lens axis angle of the camera is oriented at an angle less than horizontal, cropping out a lower portion of an image acquired by the camera; and
    rendering an upper portion of the image to the display.

15. The method of claim 1, comprising adjusting an aspect ratio of the upper portion of the image prior to the rendering.

16. The method of claim 14, comprising correcting distortion of the upper portion of the image prior to the rendering.

17. One or more non-transitory computer-readable media comprising processor-executable instructions to instruct a processor-based controller to:
    sense an open orientation of a display housing coupled to a base housing via a hinge assembly, wherein the display housing comprises a display, a display side, a back side and a back side camera;

responsive to the sensing indicating that a lens axis angle of the camera is oriented at an angle less than horizontal, crop out a lower portion of an image acquired by the camera; and render an upper portion of the image to the display.

18. A computing device comprising:

a base housing;

a display housing that comprises a display, a display side, a back side and a back side camera;

a hinge assembly that couples the base housing and the display housing;

an orientation sensor that senses orientation of the display housing; and image circuitry that, based on output of the orientation sensor, controls rendering of imagery acquired by the back side camera to the display, wherein the image circuitry controls rendering of the imagery based at least in part on the output of the orientation sensor being indicative of an angular value between the display housing and a direction of gravity, wherein, for the angular value being indicative of a lens axis angle of the camera being less than horizontal, the image circuitry crops out a lower portion of the imagery and renders an upper portion of the imagery.

19. A computing device comprising:

a base housing;

a display housing that comprises a display, a display side, a back side and a back side camera;

a hinge assembly that couples the base housing and the display housing;

an orientation sensor that senses orientation of the display housing; and image circuitry that, based on output of the orientation sensor, controls rendering of imagery acquired by the back side camera to the display, wherein the image circuitry adjusts an aspect ratio of an upper portion of the imagery, wherein, to adjust the aspect ratio, the image circuitry crops out one or more side portions of the upper portion of the imagery.

20. The computing device of claim 19, wherein, to adjust the aspect ratio, the image circuitry additionally crops out a lower portion of the imagery.

* * * * *